PROCESS FOR EXTRACTION OF SULFUR FROM SULFUR ORES

Filed Jan. 6, 1955 6 Sheets-Sheet 1

INVENTOR.
George Ford Ackert
Russell A. Peterson

PROCESS FOR EXTRACTION OF SULFUR FROM SULFUR ORES

Filed Jan. 6, 1955

INVENTOR.
George Ford Ackert
Russell A. Peterson

INVENTOR.
George Ford Ackert
Russell A. Peterson

PROCESS FOR EXTRACTION OF SULFUR FROM SULFUR ORES

Filed Jan. 6, 1955 6 Sheets-Sheet 4

INVENTOR.
George Ford Ackert
Russell A. Peterson

PROCESS FOR EXTRACTION OF SULFUR FROM SULFUR ORES
Filed Jan. 6, 1955 6 Sheets-Sheet 5
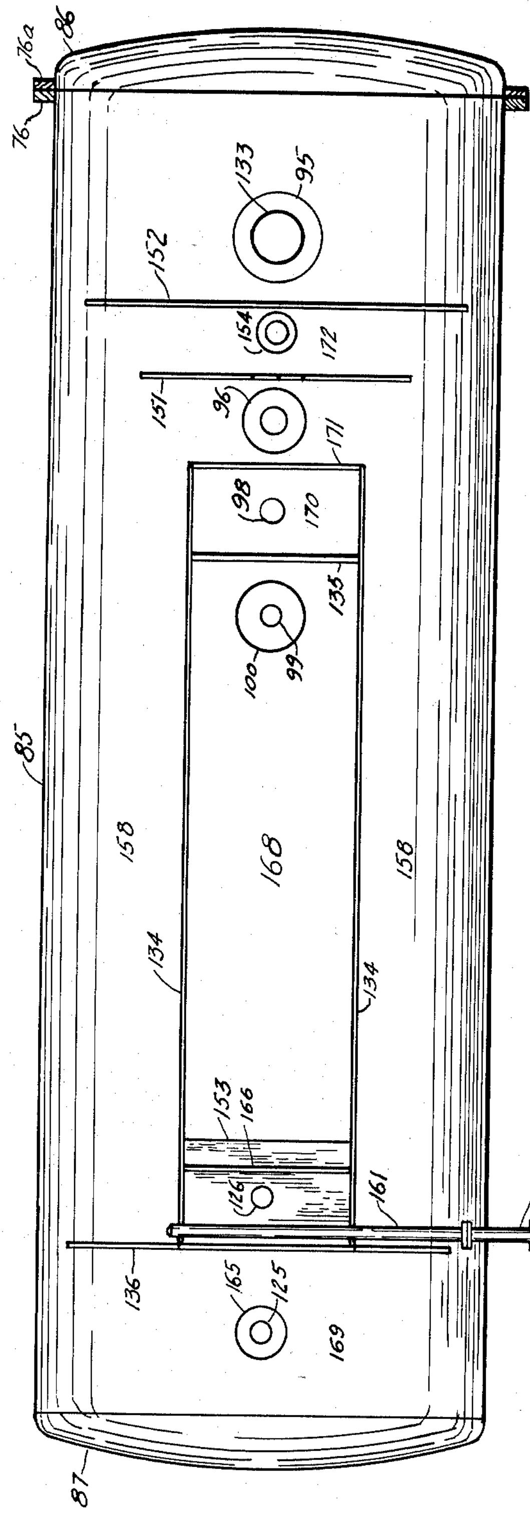
FIG. 13
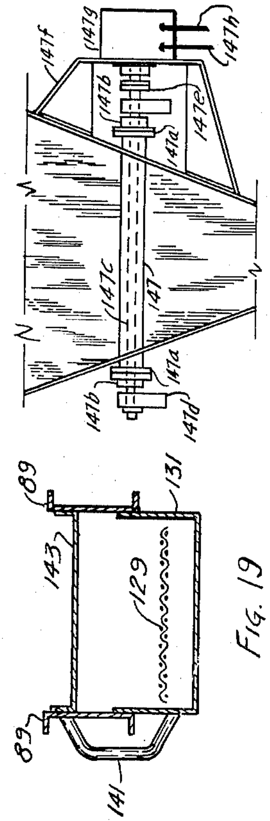
FIG. 20
FIG. 19
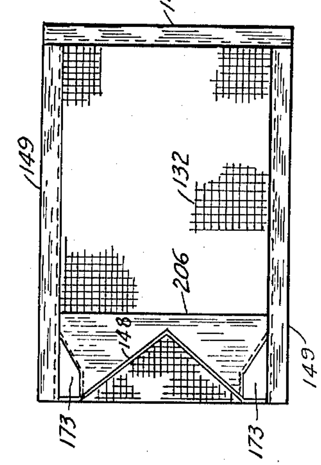
FIG. 21
INVENTOR.
George Ford Ackert
Russell A. Peterson

PROCESS FOR EXTRACTION OF SULFUR FROM SULFUR ORES

Filed Jan. 6, 1955

INVENTOR.
George Ford Ackert
Russell A. Peterson

United States Patent Office 2,731,332

Patented Jan. 17, 1956

2,731,332

PROCESS FOR EXTRACTION OF SULFUR FROM SULFUR ORES

George Ford Ackert, Flushing, N. Y., and Russell A. Peterson, Hartford, Conn.

Application January 6, 1955, Serial No. 480,236

1 Claim. (Cl. 23—308)

Our invention relates to the extraction of the element sulfur from ores in which sulfur is present in the uncombined or elemental state in intimate mixture with earthy materials.

By novel control of temperature by means of a controlled atmosphere of saturated steam, the stream of ore is kept in continuous contact with water of constant temperature, the sulfur melts to a liquid of minimum viscosity and is then permitted to separate by gravity. An atmosphere of saturated steam in the temperature range of 280 to 300 degrees Fahrenheit is maintained in the vapor spaces of the apparatus and to prevent the temperature depression that would result from the partial pressures of gases or vapors other than steam, thermostatically controlled venting equipment must be applied to the apparatus. For conservation of water and heat energy, process water is purified and recycled without temperature change. The wet spent ore or gangue is passed into a closed chamber where pressure is reduced to atmospheric, thereby generating steam, thus reducing the amount of water remaining in the wet gangue and reducing the temperature of the stream to that of atmospheric pressure steam. This flash steam is then used in the process together with the recycled process water for initial heating of the process stream thus further conserving water and heat energy. Our process is continuous and the novelty of the apparatus is to this end.

In the drawings:

Figure 13 is a horizontal section of Fig. 12 taken on line 13—13.

Figure 19 is a partial vertical transverse section of Fig. 12 taken on line 19—19.

Figure 20 is a vertical transverse section of the vibrating screener mechanism taken on line 20—20 in Fig. 12.

Figure 21 is a plan view of the vibrating screener.

Figure 1:
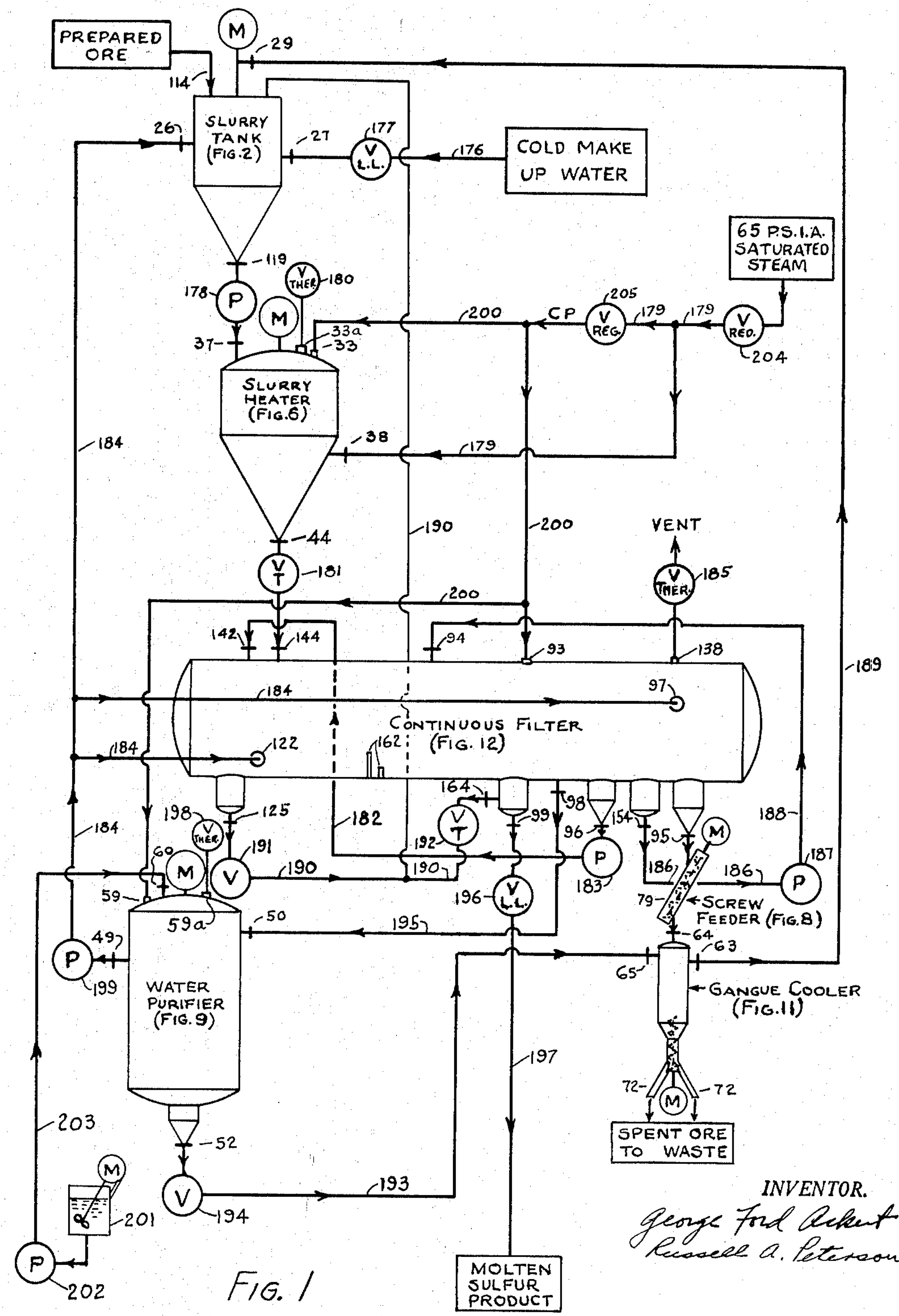
Figure 1 is a general flow diagram of our invention with the apparatus shown in approximate vertical order.

The method for extracting sulfur from sulfur ore herein disclosed requires the mechanical mixing of crushed ore and water in an open vessel equipped with a mechanical agitator to produce a slurry which is heated by admixture of hot recycled process water and the condensation of low pressure steam recovered from the process.

By means of a suitable pump this preheated slurry is injected into a closed pressure vessel equipped with a mechanical agitator. Steam is injected into and condensed by the slurry in such quantity so as to raise the temperature to 280 to 300 degrees Fahrenheit thus causing the sulfur to melt to a liquid.

The melting and heating causes the sulfur to expand to a degree that greatly exceeds the expansion of the gangue thus causing disintegration of the ore particles. By virtue of the rapid and turbulent motion in the slurry heater the globules of molten sulfur come in contact and agglomerate, forming comparatively large globules. The gangue at the same time is thoroughly wetted by the water present and thereby prevented from contaminating the sulfur.

The slurry which now consists of a mechanical mixture of water, gangue and molten sulfur is then passed to the continuous filter and deposited upon the filter medium which consists of a layer of wet gravel previously deposited upon a moving metallic screen.

An atmosphere of saturated steam in the temperature range of 280 to 300 degrees Fahrenheit is maintained in the slurry heater, the continuous filter and the water purifier by the admission of saturated steam from a single controlled source and by the provision of thermostatic venting equipment on each of these units.

In the continuous filter, the molten sulfur and most of the water drains out by gravity. The screen serves to support the gravel which retains most of gangue fines in the interstices and supports the layer of gangue or spent ore. The filtrate consisting of sulfur and water is collected below the screen and led to a settling tank within the continuous filter. The filtrate flows across and upon a body of molten sulfur, the sulfur settles out and the filtrate water passes over a weir, and is discharged to the water purifier. Any heavy particles not in water suspension and having a density exceeding that of the molten sulfur sink through the molten sulfur and collect in the bottom of the sulfur tank as a sludge. This sludge is drawn off and refluxed into the slurry tank. The molten sulfur draw-off level is set above the bottom of the sulfur tank to provide a sludge sump. The sulfur level is controlled so that it always is slightly lower than the weir. The sulfur level is controlled by a throttling valve in the draw-off line which valve is controlled by means of an electrical circuit which responds to two pairs of electrodes of different heights, the circuit being closed when water contacts the electrodes as sulfur is a dielectric. Despite the fact that most gangue found in sulfur ores has a density exceeding that of sulfur it has been found that these materials will readily form an effective suspension in water and float on top of molten sulfur due to the pronounced immiscibility of sulfur and water.

The gangue and gravel are removed from the screen and are deposited upon a vibrating screener where the gangue sifts through and the gravel is recovered. The recovered gravel is then flooded with water and pumped back and deposited upon the screen as the filter medium. The gangue passes out of the continuous filter, enters the screw feeder which propels the gangue into the gangue cooler.

As the gangue cooler operates at atmospheric pressure a portion of the water in the hot wet gangue flashes into steam, consequently cooling the stream to the temperature of atmospheric steam, thereby recovering a substantial portion of the water and the sensible heat in the form of low pressure steam.

The filtrate water is purified in the water purifier by a process of flocculation. This flocculation forms by colloidal action of the suspended solids and or by the introduction of substances or chemicals into the water entering the purifier. The sludge of precipitants that forms in this unit is moved to a sump by a slow moving agitator and then is discharged into an auxiliary inlet connection of the gangue cooler in order to recover a portion of the water and the sensible heat in the form of atmospheric steam.

Referring to the general flow diagram Fig. 1: Prepared ore enters the slurry tank Fig. 2 by ore chute 114 at a controlled rate, flash steam from the gangue cooler Fig. 11 enters by 29 from line 189, cold make-up water enters by 27 from line 176. The rate of flow of make-up water is controlled by liquid level control valve 177 which is inversely responsive to the liquid level in the water purifier Fig. 9. Hot recycled process water enters by 26 from branching line 184. The preheated slurry passes out 119 and enters slurry pump 178.

Figure 6:
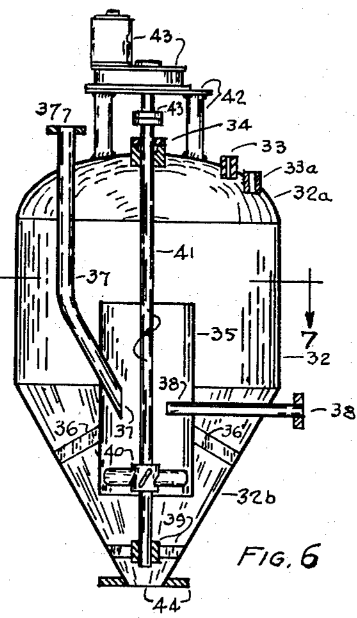
Figure 6 is a vertical section of the slurry heater.

Pump 178 injects the slurry into the slurry heater Fig. 6 by connection 37. The slurry is agitated, and heated by the admission of steam through connection 38 by branching line 179. The unit is vented by thermostatic valve 180 through connection 33a. Controlled atmosphere steam enters through 33 by branching line 200. Heated slurry passes out through 44, the rate of flow being regulated by throttle valve 181.

Figure 12:
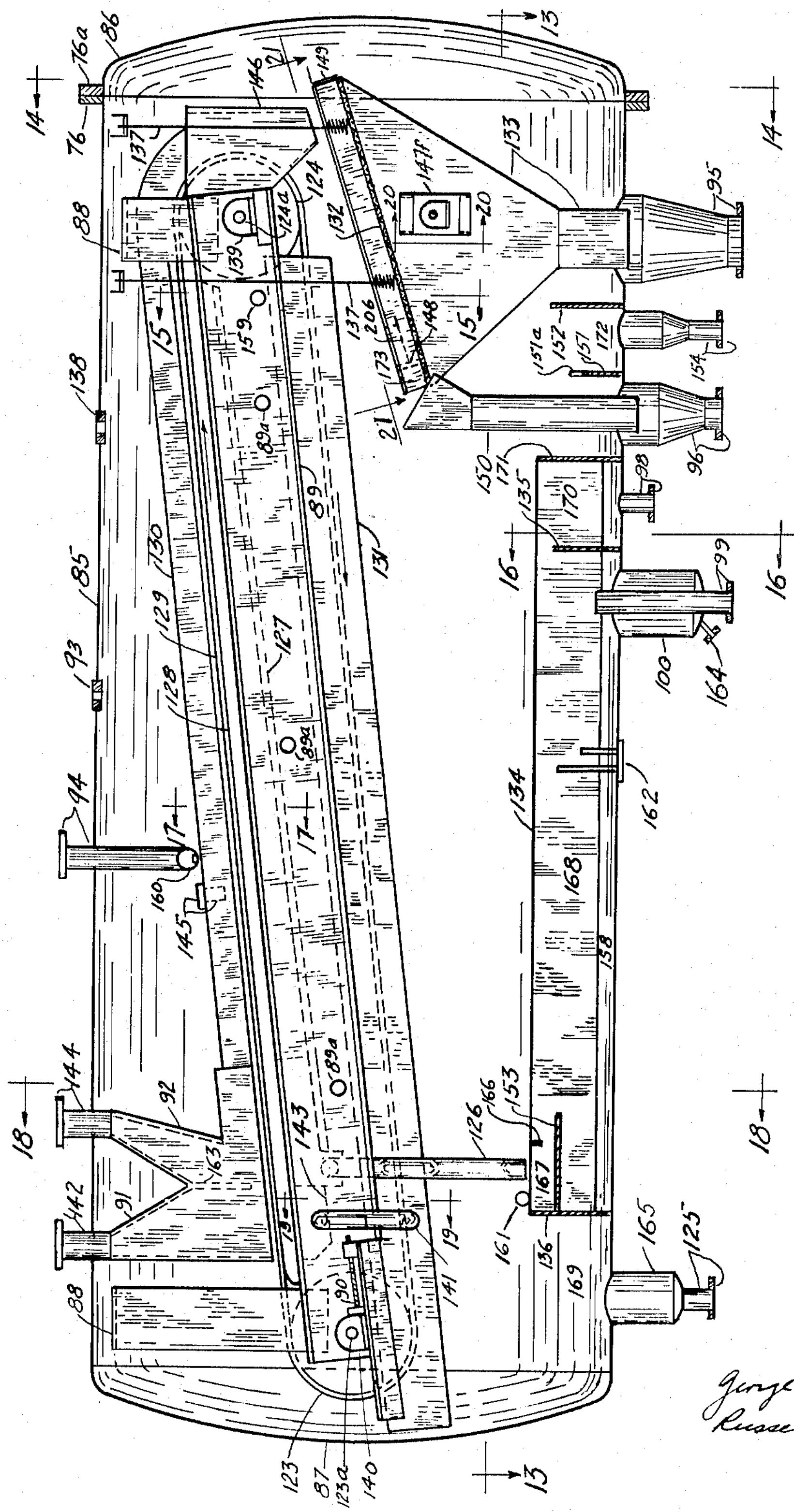
Figure 12 is a vertical longitudinal section of the continuous filter.

The stream then enters the continuous filter Fig. 12 by connection 144. The gravel precoat or filter medium flooded with water enters by connection 142 from line 182. Recovered gravel flooded with water leaves the continuous filter by connection 96, enters gravel pump 183 and is discharged into line 182. Surface wash water enters connection 122 from branching line 184 and screen back-wash water enters connection 97 from 184. Controlled atmosphere steam enters connection 93 from branching line 200. 185 is the thermostatic vent valve on connection 138. Propellant water for the gravel and screen back-wash water join flows within the unit and then floods the gravel outlet 96. The excess water passes over a weir and leaves the filter by 154 and enters line 186, the suction for pump 187, which discharges into line 188 which in turn leads into filter-cake wash connection 94. Spent ore or gangue leaves the unit by 95. The molten sulfur product flows out connection 99 through line 197, the rate of flow being controlled by liquid level control valve 196 which is directly responsive to the liquid sulfur level in the filter. 196 is controlled by electro-mechanical means by the use of electrodes 162 which sense the sulfur liquid level. 125 is the sludge blow-off connection for the internal water tank which receives the stream of water from the screen backwash and the gravel. The rate of flow of this sludge is controlled by valve 191 which connects into line 190. Sulfur sludge flows out of the filter by connection 164, the rate being controlled by throttle valve 192 which discharges into line 190.

Branching line 190 is a reflux line which picks up the sulfur sludge and the water sludge discharges from the continuous filter and leads the flow into the slurry tank Fig. 12.

Figure 9:
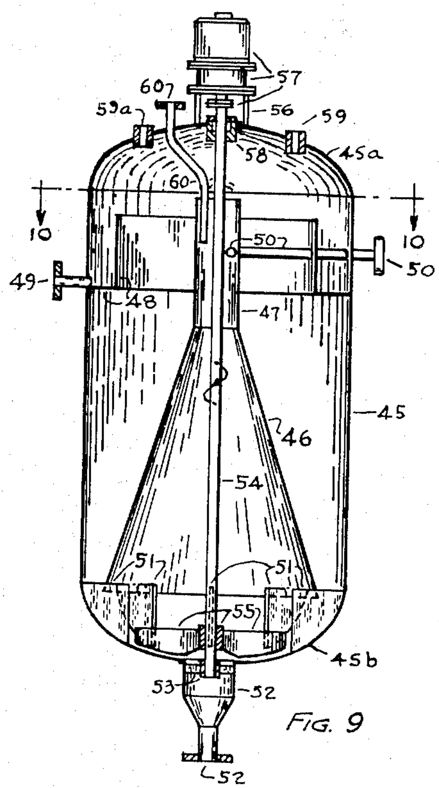
Figure 9 is a vertical section of the water purifier.

Filtrate water leaves the continuous filter Fig. 12 by connection 98 and flows by line 195 to inlet connection 50 of the water purifier Fig. 9. 59 is the connection for admission of the controlled atmosphere steam from line 200 and 59a is the connection for thermostatic vent valve 198. The purified water outlet 49 connects to the suction of pump 199 which discharges into branching line 184. Sludge blow-off connection 52 discharges by valve 194 into line 193. Branching line 184 is the process water reflux line and connects to the slurry tank Fig. 2, and the continuous filter Fig. 12. 201 is a chemical mixing and feed tank having a mechanical agitator for preparation of materials for promotion or control of flocculation and for control of the pH or hydrogen ion concentration of the water in the water purifier, Fig. 9. 202 is the chemical feed pump and 203 is the chemical feed line which connects to 60, the inlet on the water purifier Fig. 9.

Figure 11:
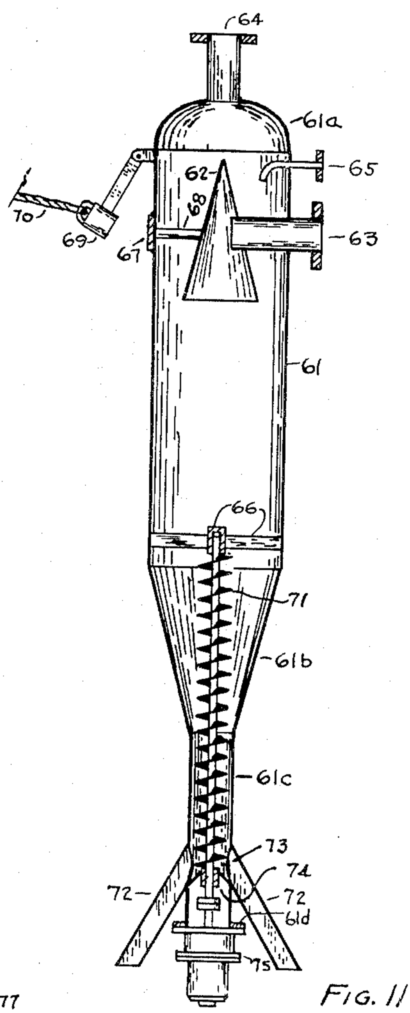
Figure 11 is a vertical section of the gangue cooler.
Figure 8:
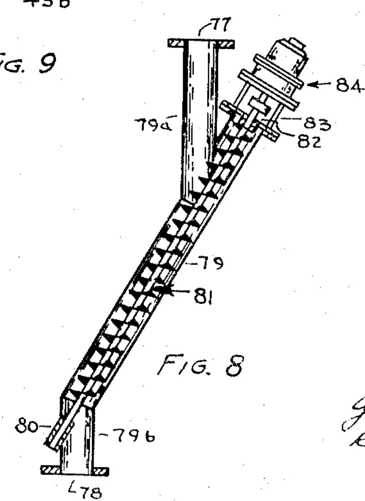
Figure 8 is a vertical section of the screw feeder.

The stream of wet gangue leaving the continuous filter, Fig. 12 by 95 enters the screw feeder Fig. 8 which provides the necessary pressure seal and propels the stream into the gangue cooler Fig. 11 by connection 64. Sludge blow-offs from the water purifier enter connection 65. Flash steam generated in the gangue cooler leaves by connection 63 and enters line 189. The cooled gangue or spent ore leaves the gangue cooler by the discharge chutes 72 and passes to waste.

204 is the primary steam pressure regulator that controls the pressure to 58 pounds per square inch absolute in branching line 179 which supplies steam to the slurry heater, Fig. 6, and to the provision constant pressure regulator valve 205 that maintains in branching line 200 a pressure of 50 pounds per square inch absolute and thus acts as the principal means of temperature regulation for the process. Line 200 is the source of the controlled steam atmosphere.

No attempt has been made to show any equipment or features in Fig. 1 that are not ideally required by the process. Such equipment would be: thermometers, pressure gages, heat insulation, level indicators, etc. all of which are available in the open market.

Figure 4:
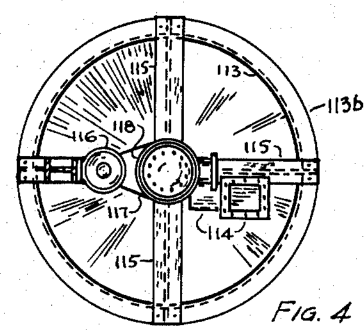
Figure 4 is a plan view of Fig. 2.
Figure 2:
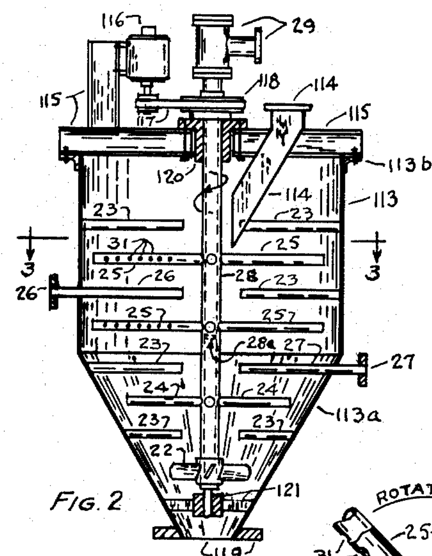
Figure 2 is a vertical section of the slurry tank.
Figure 5:
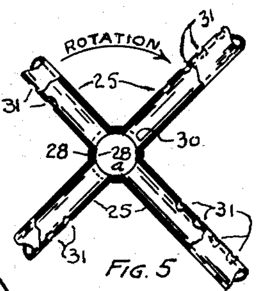
Figure 5 is an enlarged view partially in section, of the steam admission blades of the agitator of Fig. 2.
Figure 3:
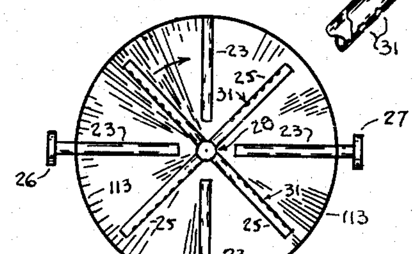
Figure 3 is a horizontal section of Fig. 2 taken on line 3—3.

The slurry tank is shown in vertical section in Fig. 2, in plan in Fig. 4 and in horizonal section in Fig. 3. Fig. 5 is an enlarged view of a portion of the agitator. 116 is the drive motor and pulley, 117 is the transmission belt, 118 is the agitator drive sheave, 120 is the upper guide and support bearing, 115 is a support frame for the drive 116 and bearing 120, 121 is the lower agitator guide bearing and support, 22 is a multi-bladed propeller, 23 are radial blades fixed to shell or tank 113 and 113a.

25 are radial tubular arms attached to shaft 28, closed at the outer ends and perforated on the sides opposite to the direction of rotation by openings 31 into the interiors of 25 that connect by openings 30 to the interior of shaft 28 to form a continuous steam passage. Plug 28a seals off the lower interior of 28 below the lowest openings 30. 29 is the stationary steam inlet coupled to shaft 28 by a rotary pressure seal, a commercial device available in the open market.

26 is the hot process water inlet replacing one of blades 23. 27 is the make up water inlet replacing one of blades 23 in a row below 26. 114 is the ore inlet chute. The shell or tank consists of vertical cylinder 113, and inverted conical frustrum 113a. 113b is a top circular stiffener to which 115 is attached. 119 is the bottom discharge connection.

The slurry tank Fig. 2 is operated in the following manner: Hot recycled process water enters by connection 26 and make-up water enters by connection 27, both into the central rising flow produced by 22, and prepared ore stream enters by 114 into this same rising flow. The central rising flow becomes radial at the operating level and then becomes a downward flow upon reaching the shell 113, upon entering 113a the flow becomes converging and a major portion of the flow recycles by being drawn into 22.

During circulation the contents are heated by condensation of recovered steam which enters 29, passes down through 28, and enters blades 25 through openings 30 and then enters into the contents through perforations or orifices 31. Due to the rapid motion of blades 25 through the contents, negative pressure is created on the trailing edges of blades 25 where openings 31 are located. This negative pressure is a function of the square of the speed of rotation and thus can be regulated to induce steam flow by regulation of agitator speed.

Fixed blades 23 and rotating blades 24 and 25 cause turbulence in the contents resulting in effective mixing and maintaining the ore in suspension. That portion of the downward converging flow that does not recycle through 22 continues in direction and passes out discharge 119

Figure 7:
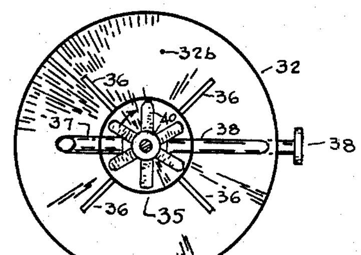
Figure 7 is a horizontal section of Fig. 6 taken on line 7—7.

The slurry heater is shown in vertical section in Fig. 6 and in horizontal section in Fig. 7. 42 is the drive mounting, 43 is the drive and coupling, 34 is the upper guide bearing and pressure seal for impeller shaft 41. 39 is the lower guide bearing and support. 40 is a multi-bladed propeller which produces an upward flow within vertical cylindrical shroud or baffle 35 which is located and supported by braces 36. 38 is the steam inlet connection and feed tube which projects through 35. 37 is the slurry inlet connection and feed tube and projects through 35. 33 is the atmosphere steam connection and **33*a* is the thermostatic vent connection. The pressure vessel or shell consists of vertical cylinder 32, semi-ellipsoidal or hemispherical head 32*a*, and inverted conical frustrum 32*b* with outlet connection 44**.

The operation of the slurry heater is as follows: slurry is introduced through 37, 40 by rotation produces upward flow in 35, this flow becomes radial after leaving 35 and reaching the operating level. The radial flow changes to downward upon reaching the shell 32 and then converges in **32*b*. As the flow passes the lower terminus of 35 most of the flow re-enters due to the action of impeller 40 and thus recycles. Steam admitted by 38 enters the rising flow within 35, and thus condenses and heats the vessel contents. That portion of the flow which does not recycle through 35 continues downward and out discharge 44**.

Figure 10:
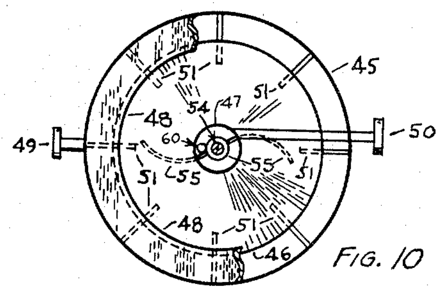
Figure 10 is a horizontal section of Fig. 9 taken on line 10—10.

The water purifier is shown in vertical section in Fig. 9 and in horizontal section in Fig. 10 taken on line 10—10. In this section, 48, the overflow weir and launder has been terminated by broken lines so as to show a part of 46 in direct view. The pressure vessel or shell of this unit consists of vertical cylinder 45, semiellipsoidal or hemispherical heads **46*a* (top), and 46*b* (bottom). 56 is the support for drive and coupling 57, 58 is the upper guide bearing and pressure seal for scraper shaft 54. 55 are the scraper blades formed to fit closely to bottom head 45*b* and to direct the sludge to the outlet 52. 59 is the steam atmosphere connection and 59*a* is the thermostatic vent connection. 53 is the lower guide bearing and support for shaft 54. 48, the purified water overflow weir and launder consists of a short cylindrical skirt attached to a flat ring which is attached to the shell 45. 49** is the launder outlet connection for the purified water.

Chemicals or the other substances to promote or control fluocculation and to control pH or hydrogen ion concentration are introduced into the mixing zone by connection and feed tube 60. The mixing zone lies within vertical cylinder 47 into which the filtrate or process water enters tangentially by connection and feed tube 50 which causes rotation. The flow moves downward with progressively decreasing velocity due to the increasing diameter of conical baffle 46 which is supported by anti-swirl baffles 51 that are attached to bottom head **46*b***.

Due to the presence of colloids a flocculation forms within 46 and progressively enmeshes and agglomerates the suspended particles. The flow passes under the lower edge of 46 and between baffles 51, reverses and becomes upward of progressively decreasing velocity due to the decreasing diameter of 46 as the flow rises between 46 and the shell, 45. In this the separation zone the sinking velocity of the flocculation and the agglomerated solids exceeds the rising velocity of the water and separation takes place.

The purified water stream then overflows the weir 48 and leaves the unit by 49. As the density of the flocculation increases, sludge forms in the bottom of the unit and is propelled into sump 52 by the scraper and blown off.

The screw feeder is shown in vertical section in Fig. 8. The shell or body consists of vertical inlet cylinder **79*a*, screw cylinder 79 which is inclined, and vertical outlet cylinder 79*b*. A screw or helicoid 81 with a central shaft is located axially within 79. 84 is the drive and coupling and 83 is the drive support. 80 is the lower guide bearing for 81. 82 is the upper shaft guide bearing, shaft seal and shell cover plate. The stream of gangue enters 77 and drops into screw 81 which propels it out discharge connection 78. By making the length, pitch and speed of the screw suitable, with a good fit in 79**, an effective pressure seal will obtain when the unit is full of wet gangue.

The gangue cooler is shown in vertical section in Fig. 11. 64 is the inlet connection, **61*a* is the top dished head, 61 is the vertical cylindrical shell, 61*b* is an inverted conical frustrum, 61*c* is a small diameter vertical cylinder with lower openings 73 into discharge chutes 72. 74 is a lower shaft guide bearing and shaft seal, 75 is the drive and coupling mounted on flange 61*d*. 66 is the upper shaft guide bearing and support for vertical screw or helicoid 71 which has a central shaft or spindle. 65** is the auxiliary inlet connection.

62 is a vertical hollow conical inlet baffle which is penetrated and supported by steam outlet tube and connection 63. 67 is an anvil plate attached to shell 61. 68 is a sound post attached to shell 61 and cone 62. A cord 70 is shown for raising and dropping pivoted hammer or rapper 69 so as to strike 67 in order to jar loose any gangue that might accumulate on shell 61 or cone 62.

Hot wet gangue enters 64 from the screw feeder Fig. 8 and drops upon cone 62 which causes the flow to break up. As this unit operates at atmospheric pressure a part of the water present in the stream flashes into steam thus reducing the temperature of the stream to that of saturated steam at atmospheric pressure thereby effecting a heat and water recovery. The now cooled stream of gangue continues downward and collects in the lower part of the unit from which it is continuously removed by screw 71 and discharged to waste through chutes 72. The pitch, diameter and speed of screw 71 is to be so chosen that a sufficient depth of material is detained within the unit to act as a seal and prevent the entrance of air or the loss of steam.

Figure 14:
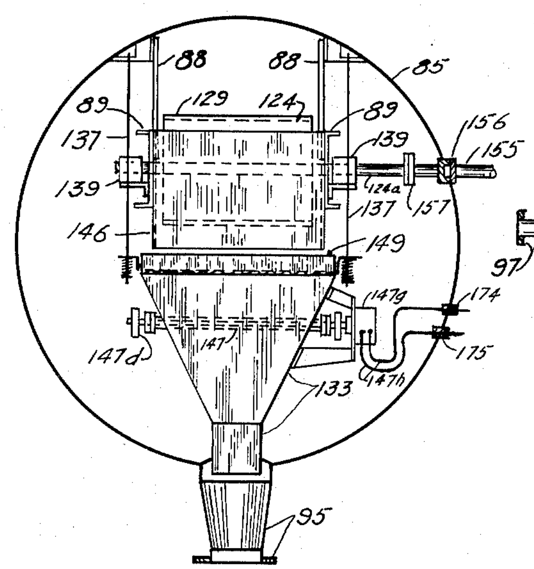
Figure 14 is a vertical transverse section of Fig. 12 taken on line 14—14.
Figure 15:
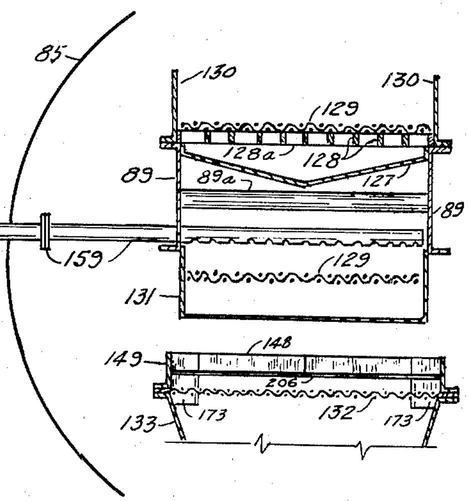
Figure 15 is a partial vertical transverse section of Fig. 12 taken on line 15—15.
Figure 16:
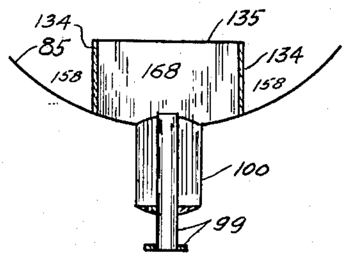
Figure 16 is a partial vertical transverse section of Fig. 12 taken on line 16—16.
Figure 18:
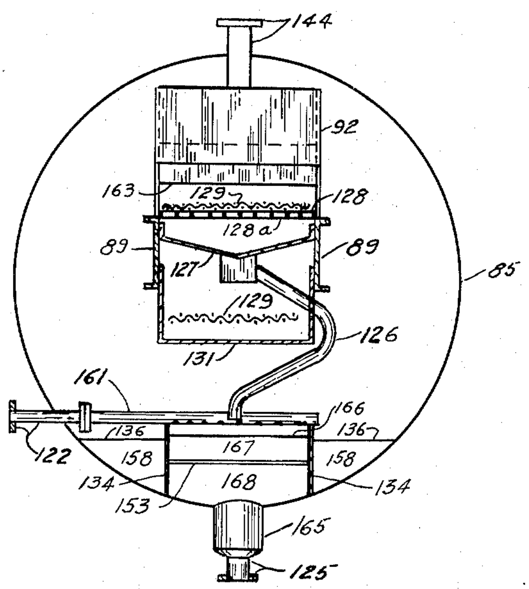
Figure 18 is a vertical transverse section of Fig. 12 taken on line 18—18.
Figure 17:
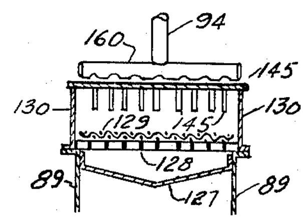
Figure 17 is a partial vertical transverse section of Fig 12 taken on line 17—17.

The continuous filter is shown in vertical longitudinal section in Fig. 12, in horizontal longitudinal section in Fig. 13, and in vertical transverse section in Figs. 14 and 18. Partial vertical transverse sections are shown in Figs. 15, 16, 17, 19 and 20. 21 is a plan view of the vibrating screener. The filter shell is a pressure vessel housing the process apparatus and consists of a horizontal cylindrical shell 85, dished head 87, and shell cover, dished head 86. The shell cover 86 is attached by flanged joint **76—76*a*. 93 is the steam atmosphere connection and 138 is the thermostatic vent connection. The process apparatus consists of a slow moving inclined belt conveyor screen filter 129, 124, 124*a*, 123, 123*a*, 90, 140, 139, 89, 89*a*, etc., and a vibrating screener 132, 148, 133, 149, etc. A gravel filter medium or precoat is deposited upon the conveyor filter screen 129 by feed hopper 91. 142 is the gravel inlet connection. The depth of the gravel is controlled by cut off plate 163, shown fixed but can be constructed so as to be adjustable in height. Propelling water drains out of the gravel, through the filter screen into collecting sump 143. This water is transferred by pipe 141 into launder or flume 131. 159 is a spray header that back washes screen 129. 97 is the water inlet connection for 159**. The back wash water passes through the screen and drops into launder 131. The gravel water and the backwash water discharge from launder 131 into tank 169 formed by 85, 87, and end and weir plate 136. Settled out solids or sludge travel into sump 165 and are discharged through blow-off connection 125. Heated slurry stream from slurry heater Fig. 6 enters the filter by connection 144, flows into feed box 92 and is deposited upon the gravel in layer form. The layers of gravel and slurry travel with screen 129 and discharge as they pass over the head or drive pulley 124. The conveyor speed may be regulated to suit the filtration time requirements of the particular ore. In the first third of the filtration period or travel the major portion of the filtrate (molten sulfur and slurry water), will drain out of the filter cake (ore slurry and gravel). As the filter cake continues movement with the screen 129 it is agitated by fixed rake 145 and then flooded with water by spray header 160. 94 is the cake wash water inlet connection for 160. During the next two thirds of cake travel most of the remaining molten sulfur and the cake wash water will drain out of the cake. The filtrate consisting of molten sulfur and water containing some suspended solids drops through the screen 129 and is collected in launder or flume 127, then flows by pipe 126 into distributor box 167 formed by side plates 134, end plate and weir 136, horizontal deflector plate 153, and cut off plate 166. To dilute the water suspension and increase its velocity of flow over the body of molten sulfur, hot water is added by spray header 161. 122 is the inlet connection for 161. The filtrate leaves distributor box 167 and enters settling tank 168 as a horizontal stream from which, the sulfur separates by gravity, the water suspension continues over the surface of the molten sulfur and then discharges over horizontal weir 135. Sulfur settling tank 168 is formed by the bottom of 85, side plates 134, end plate 136, and weir plate 135.

Any solids not in water suspension with a density exceeding that of sulfur sink to the bottom of tank 168 and are drawn off by continuous discharge from sump 100 by blow-off 164. The molten sulfur product flows out of tank 168 by draw-off tube and outlet connection 99 which extends up into tank 168 a sufficient distance to be above any sludge lying in tank 168. The sulfur draw-off rate is controlled by a liquid level control valve that is responsive directly to the molten sulfur level which is sensed by two pairs of electrodes 162 that project upward into the body of molten sulfur in tank 168.

The filtrate water that overflows weir 135 drops into tank 170, formed by weir plate 135, side plates 134, and end plate 171. 98 is the draw-off connection for tank 170, the outlet for the filtrate or process water. Water in tank 169 overflows the two weirs in end plate 136 and enters tank 158 which surrounds tank 168. Tank 158 is formed by shell 85, side plates 134, weir plate 136, and dam and weir plate 151. Water in tank 158 floods gravel outlet 96 and the excess then flows through triangular weir 151*a* in 151. This excess water then flows out of sump 172 which is formed by shell 85, weir plate 151, and dam 152 by discharge 154. The excess water leaving by 154 is then pumped by external means to cake wash connection 94.

The filter cake consisting of gravel and gangue is discharged by screen 129 into chute 146, and drops upon the screen deck 132 of the vibrating screener, the wet gangue sifts through into hopper 133, the gravel continues down the slope of 132 and drops into gravel hopper 150 which directs the gravel into outlet 96. Fitted above screen deck 132 is a shave-off, 148 and 206 which has been shown as fixed but may be constructed so as to be adjustable in height and position. The purpose of this shave-off is to remove excess gravel and thus control the amount of gravel being recirculated. Excess gravel lands on top of 206 and then passes by ducts 173 into gangue hopper 133.

The belt conveyor screen filter consists of the following: side frames 89, cross struts 89*a*, tail pulley 123, tail shaft 123*a*, tail shaft bearings 140 which are adjusted in position by take-ups 90, belt conveyor screen 129, side or skirt boards 130 secured to 89, filtrate launder 127, backwash and gravel water launder 131, frame supports 88, head or drive pulley 124, head shaft 124*a*, head shaft bearings 139, flexible shaft coupling 157, drive shaft 155 which passes through guide bearing and pressure seal 156, longitudinal bar frame 128 lying under screen 129 and serving as support slide, and supported by cross bars 128*a*. Screen 129 slides on bars 128 between skirt boards 130 which serve to retain the cake on the screen. Shaft 155 is driven at a suitable speed by means external to shell 85 and is not shown.

The vibrating screener consists of: screen deck 132, side frames 149, gangue hopper 133, shave-off 148, 173, and 206, and vibrator assembly 147 (Fig. 20). The vibrator assembly consists of: support tube 147 mounted transversely through hopper 133 at about the center of gravity of the unit, mounting flanges 147*a*, flange mounted bearings 147*b*, central concentric shaft 147*c*, eccentrically mounted or unbalanced flywheels 147*d* secured to 147*c* with unbalances in phase, flexible coupling 147*e*, motor mounting flange 147*f*, hydraulic motor 147*g* which is a commercial device available in the open market, flexible tubing connectors 147*h*, and shell connections 174 and 175.

Hydraulic motor 147*g* is caused to rotate by a stream of fluid at high pressure that then returns to its source. The pump or other device for circulating the hydraulic fluid connects to 174 and 175 and has not been shown as it is to be a commercial device available in the open market. Rotation of the unbalance causes the screener suspended by spring hangers 137 to oscillate or vibrate. The frequency of oscillation is a function of the speed of rotation and the amplitude is a function of the speed and magnitude of unbalance of counterweights or flywheels 147*d*.

*Other uses*

For processing sulfur ores in which the sulfur is present as an element not in chemical combination and where the sulfur is in the form of intrusions in gravel or broken rock or as a matrix in rock our process can be used by modification of the process and apparatus. The process is modified by the elimination of the gravel precoat. The apparatus modifications include: removal of screen deck 132 (Figs. 12, 15, 20) from the vibrating screener, removal of gravel hopper 150, elimination of gravel pump 183 (Fig. 1) and gravel recirculation line 182 (Fig. 1), provision of closures for connections 96 and 144 (Figs. 1 and 12) and by changing the slurry stream feed from connection 144 to gravel feed connection 142 (Figs. 1 and 12).

For the processing of sulfur ores in which an appreciable proportion of the gangue was of a water soluble nature additional water purification equipment could be incorporated in the process (Fig. 1) between the water purifier (Fig. 9) and the slurry tank (Fig. 2) so as to remove such water solubles.

What is claimed is:

In the continuous process for extracting sulfur from ore which comprises heating an aqueous ore slurry stream made of a mixture of ore, an influx stream of cold water and a stream of hot water recovered from the process, first by a stream of low pressure steam recovered from the process, secondly by injecting into said slurry stream high pressure steam in sufficient quantity to melt the sulfur contained in said stream to a liquid of minimum viscosity, meanwhile said slurry stream is agitated to a degree sufficient to permit coalescence of the molten sulfur to liquid globules and to prevent stratification of the constituents of said slurry stream, said slurry stream is then deposited upon a continuous porous surface where the water and molten sulfur contained therein said slurry stream drains through and is collected and settled, the molten sulfur being drawn off from below and the water flowing over the body of molten sulfur, said water stream is then purified and is then returned to and reused in the process, meanwhile the stream of wet gangue is continuously discharged from the continuous porous surface in such a manner that the pressure of this spent ore stream is reduced thereby causing a portion of the water contained therein to evaporate and thus supply a stream of low pressure steam that is then returned to the process and used for heating and thus by this means both the temperature and water content of the exit stream of spent ore or gangue is reduced.

References Cited in the file of this patent

UNITED STATES PATENTS

| | | |
|---|---|---|
| 1,328,210 | Shires | Jan. 13, 1920 |
| 1,374,422 | Bragg | Apr. 12, 1921 |
| 1,970,147 | Levy | Aug. 14, 1934 |
| 2,044,214 | Jones | June 16, 1936 |
| 2,211,026 | Pemberton | Aug. 13, 1940 |
| 2,253,566 | Klepetko | Aug. 26, 1941 |